US012553070B2

(12) United States Patent
Georgiev et al.

(10) Patent No.: US 12,553,070 B2
(45) Date of Patent: Feb. 17, 2026

(54) STANDARDIZED PLANT EXTRACT FROM BIOMASS OF IN VITRO CULTURES, METHOD FOR PREPARATION AND USE THEREOF

(71) Applicant: INNOVA BM Ltd., Sofia (BG)

(72) Inventors: Vasil Georgiev Georgiev, Plovdiv (BG); Atanas Ivanov Pavlov, Plovdiv (BG)

(73) Assignee: INNOVA BM LTD., Sofia (BG)

( * ) Notice: Subject to any disclaimer, the term of this patent is extended or adjusted under 35 U.S.C. 154(b) by 483 days.

(21) Appl. No.: 17/912,237

(22) PCT Filed: Apr. 15, 2020

(86) PCT No.: PCT/BG2020/000016
§ 371 (c)(1),
(2) Date: Sep. 16, 2022

(87) PCT Pub. No.: WO2021/184086
PCT Pub. Date: Sep. 23, 2021

(65) Prior Publication Data
US 2023/0193331 A1    Jun. 22, 2023

(30) Foreign Application Priority Data

Mar. 19, 2020 (BG) ........................................ 113104

(51) Int. Cl.
| C12N 5/04 | (2006.01) |
| C12N 5/00 | (2006.01) |
| C12N 15/10 | (2006.01) |
| C12P 17/06 | (2006.01) |

(52) U.S. Cl.
CPC ............ C12P 17/06 (2013.01); C12N 5/0025 (2013.01); C12N 5/04 (2013.01); C12N 15/1034 (2013.01)

(58) Field of Classification Search
CPC .............................. C12N 5/04; C12P 7/6409
See application file for complete search history.

(56) References Cited

U.S. PATENT DOCUMENTS

2023/0193331 A1* 6/2023 Georgiev ................ A61P 39/06
435/123

FOREIGN PATENT DOCUMENTS

| CN | 109414600 A | 3/2019 |
| JP | 2011168560 A | 9/2011 |

OTHER PUBLICATIONS

Ionkova, I., Nonov, St., Antonova, I., Moyankova, D., Georgieva, T., & Djilianov, D. (2008). DPPH radical scavenging activity of in vitro regenerated *Haberlea rhodopensis* Friv. plants. Journal of the Bulgarian Pharmaceutical Scientific Society, 1-4(LV).
Daskalova, E., Dontcheva, S., Yahubyan, G., Minkov, I., & Toneva, V. (2010). Ecological Characteristics and Conservation of the Protected Resurrection Species *Haberlea rhodopensis* Friv. as In Vitro Plants through a modified micropropagation system. Biotechnology & Biotechnological Equipment, 24(sup1), 213-217 (Only abstract provided). https://doi.org/10.1080/13102818.2010.10817838.
Chinese Office Action; 2020800978323; Dated Mar. 17, 2025.
Chinese Search Report; 2020800978323; Dated Jul. 11, 2024.
Japanese Office Action; 2022-554456; Dated Feb. 14, 2024.
Georgieva, M., Moyankova, D., Djilianov, D. et al. Methanol extracts from the resurrection plant *Haberlea rhodopensis* ameliorate cellular vitality in chronologically ageing *Saccharomyces cerevisiae* cells. Biogerontology 16, 461-472 (2015). https://doi.org/10.1007/s10522-015-9566-z.
Dell'Acqua G, Schweikert K. Skin benefits of a myconoside-rich extract from resurrection plant *Haberlea rhodopensis*. Int J Cosmet Sci. Apr. 2012;34(2):132-9. doi: 10.1111/j.1468-2494.2011.00692.x. Epub Nov. 15, 2011. PMID: 22023081.

(Continued)

*Primary Examiner* — Tekchand Saidha
(74) *Attorney, Agent, or Firm* — Dunlap Bennett & Ludwig PLLC; Anna L. Kinney

(57) ABSTRACT

The invention refers to standardized plant extract from biomass of in vitro cultures of *Haberlea rhodopensis* Friv. (HR), containing bioactive compounds and their primary secondary metabolites, containing in weight %, as follows: organic acid from 4.0 to 6.0, fatty acids from 0.5 to 1.5, amino acids from 8.0 to 12.0, sterols from 0.5 to 1.0, free phenols from 3.0 to 6.0, sugars from 45 to 55, and polyphenols from 25.0 to 35.0, with a predominant myconoside content of 70% to 96% in the polyphenolic fraction, constituting 18% to 35% of the total extract, and to a composition containing the standardized extract and glycerol as well as to a method for the preparation of a standardized plant extract.

The method according this invention, along with its optimally chosen steps, specific conditions, parameters such as temperature, duration, stirring, light, growth factors, etc. achieves both maximum volumetric productivity of the target substances and myconoside, as well as stable productivity of the plant in vitro cultures and is a reliable efficient 24/7 continuous system for production of NPs.

Dependence on natural factors, limited availability and protection of HR rare wild plant populations are eliminated. The limitations posed by seasonality and slow HR growth are also avoided by developing a renewable, ecologically method. The developed method provides alternative, renewable and sustainable sources of raw plant material necessary to obtain the target extract. The resulting extract standardized in myconoside is especially valuable with its protective action on human health and can successfully be used with its pharmacological, cosmetic effects as well as in functional foods.

21 Claims, 1 Drawing Sheet

(56) References Cited

OTHER PUBLICATIONS

Roumiana Todorova & Atanas T. Atanasov (2016) Haberlea rhodopensis: pharmaceutical and medical potential as a food additive, Natural Product Research, 30:5, 507-529, DOI: 10.1080/14786419.2015.1028058.

Moyankova D, Mladenov P, Berkov S, Peshev D, Georgieva D, Djilianov D. Metabolic profiling of the resurrection plant *Haberlea rhodopensis* during desiccation and recovery. Physiol Plant. Dec. 2014; 152(4):675-87. doi: 10.1111/ppl. 12212. Epub May 23, 2014. PMID: 24735127.

Wang, J., & Wen, X. (2000). Xiandai huanjing shengwu jishu [Modern environmental biotechnology] (pp. 149-154). Tsinghua University Press.

Ma, F., Feng, Y., & Ren, N. (Eds.). (2003). Huanjing shengwu jishu [Environmental biotechnology] (pp. 39-45). Chemical Industry Press.

Yu, X., Zhang, F., & Li, J. (Eds.). (1988). Xibao gongcheng [Cell engineering] (pp. 21-24). Science Popularization Press.

\* cited by examiner

STANDARDIZED PLANT EXTRACT FROM BIOMASS OF IN VITRO CULTURES, METHOD FOR PREPARATION AND USE THEREOF

FIELD OF THE INVENTION

This invention relates to a standardized plant extract, in particular, extract from biomass of in vitro cultures, where the plant extract contains valuable bioactive compounds (BAC) and secondary metabolites, and can be used for the preparation of agents for the pharmaceutical, cosmetics or food industries, as well as to the method of preparation of such extract.

BACKGROUND OF THE INVENTION

Plants in nature contain a huge variety of BAS, and their origin, growth conditions, harvest time, extraction technology, etc., affect the quality of the product.

Cultivated medicinal plants have many advantages over wild plants. Their growth can be monitored and they can be harvested at the most favourable time, while the proximity to unsuitable plant species can be avoided.

*Haberlea* is a monotypic genus, *H. rhodopensis* Friv. (Rhodopean Silivryak), or (HR) for short, being its only member. The plant is a relic of the Tertiary period, endemic to Central and Southern Bulgaria, found in the Balkan and the Rhodope Mountains, and in Northeastern Greece—the Rhodope Mountains, Mount Pangaion and Falakro Mountain. For centuries, *H. rhodopensis* has been traditionally used in ethnopharmacy and local traditional medicine (1).

It is known that plant extracts have been isolated from HR leaves. The biocompounds isolated from plant extracts are a source of essential natural ingredients. Apart from fruits and vegetables, polyphenols, glycosides, sugars, etc. are also found in plants, and, due to their physiological functions, play a significant role in human health. An ethanol extract of HR is known to have been obtained by spray drying of the whole plant, followed by three-hour ethanol extraction under agitation at room temperature, filtration, separation of the insoluble matter, followed by vacuum concentration and freeze drying to obtain the extract. The same source also provides information of an aqueous HR extract, where the whole plant is spray dried, extracted with 120° C. hot water for 20 minutes in an autoclave, followed by separation of the insoluble matter through filtration at high temperature, and freeze drying. The extracts obtained have anti-aging, anti-oxidant, skin-lightening and immunostimulatory effects (5).

There is a report on extract of HR obtained by hydroalcoholic extraction (ethanol/water, unspecified method of preparation) and purified by gel-filtration chromatography on a Sephadex LH-20, containing an isolated fraction particularly rich in phenylethanoid glycoside—a myconoside responsible for the bioactivity of *Haberlea* extracts. In the same source, the effectiveness of the extract was observed and myconoside was reported to stimulate the antioxidative protection of the skin, to improve its elasticity by stimulating the synthesis of extracellular structures, and to possess cytoprotective and UV-protective effects, serve as a skin anti-aging agent protecting it against oxidation, increasing its elasticity, enhancing its radiance and to have potential cosmetic applications (3).

It is also known that the phytochemical composition of 70% ethanol extract of HR leaves contains a large group of major bioactive compounds, including secondary metabolites, such as: phenolic acids, flavonoids, fatty acids, phytosterols, carotenoids, soluble lipids, oligo- and polysaccharides, free sugars, polyols, organic acids, including myconoside, with proven antioxidant and hepatoprotective effects (1).

Data on the phytochemical profile of methanol extract of HR leaves prepared by using a combination of liquid/liquid extraction, preparative and semi-preparative HPLC containing two phenolic glycosides: myconoside and paucifloside is also available. The myconoside-rich fraction (caffeoyl phenylethanoid glycoside) has a potential role in plant survival, and possesses antioxidant activity due to the presence of caffeoyl and two free hydroxyl groups in its phenyl ring. The major BAC groups and secondary metabolites found in various HR extracts during normal growth and during the dry period of plant development are organic acids, fatty acids, amino acids, phenolic acids, and sugars (4). Nowadays, HR extracts obtained directly from the naturally growing species have been successfully applied in cosmetics, homeopathy and pharmacy, owing to their proven antimicrobial, antiviral, antioxidant, immunomodulatory, cytotoxic, anti-cancer, chemopreventive, gene-protective, and radioprotective properties.

On the other hand, being particularly valuable and rare endemic species, HR is among the plant species whose collection from nature is prohibited. In recent years, for instance, in vitro systems for the regeneration and micropropagation of HR have been established with the aim to protect the natural populations of this rare plant species. An in vitro bank of HR plants from different locations has been set up. The same source also describes an effective method of regeneration and micro-propagation in which the seeds of the plant species are sterilized with 70% EtOH for 1 min, treated with hypochloride for 6-10 min, and with 0.1% $HgCl_2$ for 3-5 min, and triple-rinsed with distilled water, and the resulting sterile HR seeds are placed on classic hormone-free MS medium (as well as MS BS, WPM), to germinate for 3-4 months and obtain seedlings. Subculturing of the plant clusters for 1-1.5 months gave in vitro systems of fully developed plants, ready for transformation in the course of 6-7 months under non-sterile conditions in a controlled greenhouse environment (2).

At the same time, plant biotechnology, in particular in vitro cultivation of plant cells, has become a promising tool for sustainable and continuous production of BAC from plants. The principles of plant cell culture and plant cell propagation in solid and liquid nutrient media, as well as the general processes associated with the establishment and cultivation of plant cells, have been described for other plant species, different from HR.

Separate extracts from plant cell cultures of *Rosa* sp. have been obtained, containing valuable natural products (NP) for cosmetic skin and hair care, preventing signs of aging, according to (6). Plant cell biomass is used for the production of phenylpropanoids from *Ajuga repens*, and verbascoside from *Olea europea*, *Syringa vulgaris* or *Appia citobara*, as well as production of verbascoside-standardized extract from *Syringa vulgaris* cell cultures, with proven antioxidant activity, effective in treating acne and preventing hair loss, according to (7).

A preparation in the form of in vitro culture extract of *Argania spinosa*, intended for the treatment of skin aging and skin inflammation has also been made, according to (8). Standardized extract, obtained from in vitro undifferentiated plant cells of *Dracocephalum ruyschiana*, containing BAC with proven antiradical activity and cosmetic application for skin protection and regeneration, where in vitro propagated undifferentiated cells of *Dracocephalum ruyschiana*, grown in semi-solid or liquid medium have been obtained in darkness or under photoperiod for 14-16 hours with separation of the cellular biomass followed by biomass extraction with ethanol or ethanol, glycerol and water in ratios of 20:20:60 to 50:50:0 (v/v), drying of the biomass and further extraction with the same extractant, according to (9).

So far, there has been no report on extract from biomass of HR in vitro cultures, with BAG and secondary metabolites.

In spite of the fact that, the general principles for the cultivation of plant cells are not applicable to large-scale cell propagation for production purposes, and specific technological processes need to be developed. In order to maintain plant in vitro cultures (differentiated or non-differentiated) under in vitro cultivation conditions, it is important to determine the optimal, strictly specific ratio of growth regulators (auxins, cytokinins and gibberellins), and establish it for each cell line (each plant species). Changes in cell culture conditions, as well as the use of elicitors, precursors and absorption matrices, are crucial for the production of specific bioactive compounds/metabolites, and are specific to the plant species used and to the desired target compounds.

However, the synthesis of valuable BAC and metabolic constituents in in vitro cultures is a complex process with many unknown parameters. The accumulation of natural ingredients and secondary metabolites in the cellular biomass results from the dynamic balance between biosynthesis, biotransformation and biodegradation. It is important to select the appropriate and optimal conditions-nutrient medium and stimulating factors for each ingredient inherent to the intact plant.

Often, the natural products obtained from traditional extracts are of insufficient homogeneity, and the amounts of the target therapeutic ingredients tend to vary seasonally and geographically when compared to those obtained from in vitro cultures. It is also essential to work with standardized raw materials for the purposes of obtaining in vitro biomass extract and its incorporation into products for the cosmetic, pharmaceutical or food industries.

The problem of this invention is to obtain a standardized extract, in particular extract from HR in vitro cultures (seedlings, shoot cultures, root cultures (normal, adventitious and hairy roots), somatic embryos, callus cultures, cell suspension cultures) with a guaranteed content of the phenylethanoid glycoside-myconoside, with invariable physico-chemical characteristics and composition of the concomitant BAG/components, obtained by biotechnological method with a maximally efficient design.

SUMMARY OF THE INVENTION

The problem according to the present invention is solved by a standardized plant extract, in particular extract from biomass of in vitro cultures (seedlings, shoot cultures, root cultures (normal, adventitious and hairy roots), somatic embryos, callus cultures, cell suspension cultures) of HR, containing BAC, including their secondary and primary plant metabolites-fatty acids, sterols, organic acids, amino acids, free phenolic acids, and sugars. The amount of BAC in the extract in wt. % is: fatty acids from 0.5 to 1.5, sterols 0.5 to 1.0, organic acids 4.0 to 6.0, amino acids 8.0 to 12.0, free phenols 3.0 to 6.0, sugars 45.0 to 55.0, and polyphenolic compounds 25.0 to 35.0%, containing phenylethanoid glycoside-myconoside accounting for between 70 and 96% of the polyphenolic fraction. The resulting extract from biomass of HR in vitro cultures is rich and standardized in myconoside, the amount of which ranges from 18% to 35% of the total extract. The dissolution of the standardized extract in glycerol yields a product with a controlled content of myconoside from 0.01 to 15.00% in its composition, according to the needs of the relevant industry-pharmaceutical, food or cosmetic.

The described standardized extract from in vitro cultures according to the present invention is prepared by a method comprising the following essential steps:

1) Initiation of in vitro cultures from HR, where:
   selection of an explant from an individual part or organ of a plant, in particular from leaves, stems, hypocotyls, roots, seeds, anthers, ovaries, sepals, seedlings, surface sterilization of the selected explant by repeated washing with sterile distilled water for 1-240 min, treatment with 40-85% ethanol for 10-190 sec, subsequent treatment with 2-10% disinfectant for 10-60 minutes with or without added detergent, washing with sterile distilled water and drying for 1-20 min;
   initiation of the sterile explants on semi-solid or liquid media with or without added growth regulators and cultivation at 18-32° C. in darkness or under photoperiod-light/dark for each of them for 8-16 hours, and a pH of the medium of 5.0 up to 6.2 to obtain 85-100% differentiated or undifferentiated in vitro cultures (seedlings, shoot cultures, root cultures, somatic embryos, callus cultures, cell suspension cultures) for a period of 2-5 weeks. Transfer of the resulting initiated in vitro cultures for independent growth on semi-solid nutrient media with or without added growth regulators, and with or without added reducing agents and/or antioxidants. Cultivation is performed at 18-32° C. under the same photoperiod, for 15-45 days to select 5-30% morphologically stable and high yielding, in terms of accumulation of myconoside, in vitro lines from the total number of in vitro cultures generated. The selected in vitro lines are maintained by periodic subcultivation every 20 to 35 days on fresh semi-solid media with or without added growth regulators.

2) Biomass production:
   transfer for cultivation of the selected high-yielding lines in sterile liquid nutrient medium supplemented with: a carbon source, growth regulators, antioxidants to obtain 70-100% adapted to the conditions of submerged cultivation in vitro lines or the so-called inoculum;
   inoculation in liquid medium of the resulting inoculum and its cultivation at 18-32° C. under the same photoperiod in flasks, bioreactors or in temporary immersion systems (with immersion periods of 1-30 minute and exposure periods of 1 to 12 hours), for a period of 1-6 weeks until the control content of myconoside in the biomass is not less than 80 mg/g dry biomass, followed by stimulation of production of secondary metabolites by addition of factors selected from among: elicitors, feeding with fresh nutrient medium, addition of precursors, introduction of second phase in the cultivation system for the recovery of secreted secondary metabolites, or a combination thereof, for a period of 3-15 days to obtain myconoside-enriched biomass (not less than 100 mg/g dry biomass);
   separation of the myconoside-enriched biomass from the culture liquid and drying at 20-80° C. or freeze drying, with a yield of dry biomass of not less than 10-15 g/l, and optionally drying the resulting culture liquid by vacuum evaporation at 30-70° C. or freeze drying for a dry matter yield of not less than 15-30 g/l;

3) Preparation of HR biomass extract by in vitro cultures:
   mixing and homogenizing the resulting dried biomass, optionally with the culture liquid in a homogenizer;
   maceration of the dry mixture with 30-80% ethanol for 16-72 hours at 18-45° C. with or without ultrasound;
   filtering the resulting mixture and separating the precipitate, collecting and drying the filtrate under vacuum at a temperature of 30-70° C. to obtain a viscous concentrate
   (extract) containing 10-30% moisture and a myconoside content (not less than 150 g/kg) in the extract; and
   dissolving the resultant standardized extract by the addition of glycerol and stirring until complete homogenization. The resulting solution has a controlled content of myconoside from 0.01% to 15.00%, depending on the needs of the relevant industry-pharmaceutical, food or cosmetic.

Suitable nutrient media are standard semi-solid and liquid variants selected from among: MS (Murashige and Skoog), WP (McCown Woody Plant), LS (Linsmaier and Skoog), Gamborg B S, Heller, Nitsch, Schenk and White, or with modified macrosalts composition, micro-salts and vitamins. For the needs of this method, the media were further modified by adding a carbon source, such as sucrose and/or glucose (1% to 9%), activated charcoal 0-5%, reducing agent, such as 2-Mercaptoethanol and/or Dithiothreitol, in concentrations from Oto 10 mg/l, antioxidants, such as ascorbic acid and/or citric acid from Oto 10 mg/l, gelling agent agar-agar or gellrite at concentrations of 0.1% to 10%.

The main growth regulators are selected from among: auxins (picloram and a-naphthalene acetic acid), cytokinins (kinetin and 6-benzylaminopurine), and/or gibberellins at concentrations of 0-20 mg/l. Picloram and/or a-naphthalene acetic acid may be used as auxins, such as cytokinins-kinetin and/or 6-benzylaminopurine, with Gibberellic acid 4+7 and/or Gibberellic acid A3. Other possible auxins are: Indole-3-acetic acid, Indole-3-butyric acid, Dicamba, p-Chlorophenoxyacetic acid and B-Naphthoxyacetic acid), cytokinins: 2-iP, 4-CPPU, 6-benzylaminopurine riboside, Dihydrozeatin, Zeatin, Meta-tropoline and Thidiazuron) and gibberellins: Gibberellic acid.

The elicitors used are selected from among: biotic, such as polysaccharides or chitosan; or abiotic, such as methyl jasmonate, jasmonic acid, abscisic acid or with a physical factor (osmotic agents, UV light), which, when added at extremely low concentrations, serve as signals to stimulate secondary metabolism of the plant cell. Other strategies, such as feeding with fresh nutrient media, or adding precursors (amino acids and sugars), or introducing a second phase (activated charcoal or absorbent resin) into the cultivation system to capture secreted secondary metabolites, may also be applied.

Cultivation of HR differentiated and undifferentiated in vitro cultures is carried out as follows
   in bioreactors with mechanical (stirred tank) and pneumatic (bubble column) agitation for submerged cultivation under controlled conditions and a strictly maintained microenvironment, optimal for in vitro culture growth;
   in temporary immersion systems in semi-automated aseptic systems with controlled conditions and a strictly maintained microenvironment, optimal for the growth of differentiated cultures under in vitro conditions.
   Short-term controlled contact of the plant material with the nutrient medium is provided for a controlled period of time, with temporary air agitation, gravitational or mechanical motion of the liquid phase. Systems such as PLANTFORM, PLANTIMA, RALM, RITA, SETIS, or their analogues are used;
   in flasks on an orbital shaker at 80-150 rpm.

The resulting extract produced by in vitro HR cultures biomass contains the target bioactive compounds, is rich in polyphenolic compounds of up to 35% (consisting of 70-96% myconoside), sugars of up to 55% of the mixture, as well as amino acids of up to 12%, making the extract extremely valuable.

The standardized content of the phenylethanoid glycoside-myconoside, makes the extract particularly valuable because of its protective effect on human health, its successful use due to its pharmaceutical and cosmetic effects, as well as in functional nutrition. The antioxidant effect of myconoside makes it appropriate for use in cosmetics due to its anti-aging, anti-wrinkle, and anti-pigmentation action.

The method developed for preparing the extract according to this invention, with optimally selected steps, specific conditions, parameters, such as temperature, time, stirring, light, growth factors, etc., obtains not only maximum volumetric productivity of the target substances and myconoside, but also stable productivity of the plant in vitro cultures, and is a reliable efficient 24/7 continuous system for production of NPs.

Dependence on natural factors, limited availability and protection of HR rare wild plant populations are eliminated. The limitations posed by seasonality and slow HR growth are also avoided by developing a renewable, environmentally-friendly method. The method provides alternative, renewable and sustainable sources of raw material necessary to obtain the target extract.

Batch homogeneity of the final NP is ensured, as well as stable quality and guaranteed amount of myconoside in the standardized extract produced by HR in vitro cultures.

In addition, the appropriate cultivation media used, together with the optimum levels of growth factors and stimulating agents added, lead to the successful formation of in vitro cultures (seedlings, shoot cultures, root cultures, somatic embryos, callus cultures, cell suspension cultures) and generation of biomass containing the target valuable BAC. The resulting cultures have a significant scale-up potential in industrially relevant bioreactors and temporary immersion systems designed to maximize the yield and content of biosynthetic NPs.

The type and concentration of stimulating agents used (elicitors, precursors and absorption phases), the age and stage in the in vitro culture development at the time of extraction are especially important factors that are optimized and contribute to higher levels of biosynthesis and accumulation of NPs with a particularly complex molecular structure with the method used.

The risk of microbial contamination is eliminated as well as the contamination with biological material of other plant, fungal, microbial or animal species of the in vitro biomass and extract produced. Consequently, the extract having a naturally-occurring chemical composition and content of various and valuable BACs, as well as the method used to obtain maximum biomass yield and extract are considered to be preferable and especially suitable for standardization in the phenylethanoid glycoside, for implementation in the food, cosmetic or pharmaceutical industries.

DETAILED DESCRIPTION OF THE INVENTION

Examples

Figure 1A:
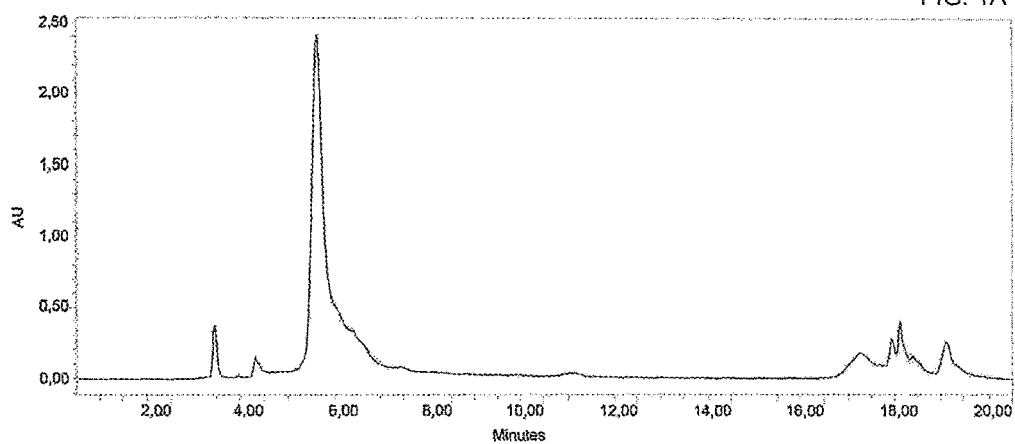
FIG. 1A is an HPLC profile illustrating the myconoside content in biomass obtained from in vitro cultures of *Haberlea rhodopensis* Friv.

Hereinafter, the present invention is described in more detailed examples, which however are not intended to limit the present invention:

Example 1

1) Initiation of In Vitro Cultures of HR:
1.1. Washing

Ten to 50 pieces of 0.6 mm×0.1 mm seeds of HR are washed twice, for 30 60 min in sterile distilled water with added gibberellins 0.5 mg/l, treated with 70% ethanol for 100 sec and with 8% calcium hypochlorite for 50 min, followed by washing twice with sterile distilled water for 5-10 min, and drying the resulting sterile seeds on sterile filter paper for 10-15 min.

1.2. Initiation

The sterile seeds are evaluated for quality and morphology, dead and morphologically altered individuals are removed, and transferred for initiation on semi-solid, pre-sterilized at 121° C. for 30 min standard MS nutrient medium with 5% sucrose and 5% agar, pH 6.0. Cultured in a thermostat at 28° C.±2° C. in darkness, for 2 weeks, with asepsis monitored until 95 to 100% of seedlings appear.

1.3. Independent Growth

The seedling in vitro cultures obtained are transferred for independent growth on semi-solid MS nutrient media with added 5% sucrose and 5% agar-agar, at pH 6.0. Cultivation is in a thermostat at 28±2° C. in light/dark mode for 12 hours for 30-35 days until morphologically stable lines are obtained. Myconoside overproduction lines are selected by periodic monitoring the amount of myconozide produced in the cultures and selecting 25% of the high-yielding lines from the total number of generated in vitro lines.

2) Biomass Production:
2.1. Maintenance, Adaptation-Subcultivation of Selected In Vitro Seedling Lines The selected lines are maintained by periodic subculturing at every 30 days on fresh semi-solid nutrient medium, the same as in step 1.3, changes in morphology and stability being monitored, and the amount of myconoside analysed. 10 g of biomass are taken from the high-yielding lines and cultivated in sterile liquid MS medium with the same additives and pH in a 2000 ml flask on an orbital shaker at 140 rpm, with changes in morphology, growth, homogeneity, stability and amount of myconoside being monitored, and the 95-100% of the most adaptive lines continue for subsequent submerged cultivation as inoculum.

2.2. Cultivation of Adapted In Vitro Seedling Line Systems for Biomass Production Inoculation is with 25 g of fresh weight/l of liquid culture, at 20 days of age (exponential phase of growth). Cultivation is performed at 28° C. in light/dark for 12 hours for 5 weeks in a temporary immersion system with an immersion period of 25 min and exposure period of 6 hours. As a result, 180 g of fresh biomass per litre is obtained, and the myconoside content is 105 mg/g dry biomass;

2.3. Stimulation of Biomass Production

To 20- to 40-day-old biomass (at exponential phase of growth), abiotic elicitors jasmonic acid and methyl jasmonate are aseptically added at a concentration of 5 mg/l, and cultivated under the above conditions for 12 days. At the end of the process, enriched biomass with a myconoside content of 152 mg/g dry biomass is obtained. Separation of the biomass from the culture liquid by filtration through a sterile sieve is followed by washing with sterile distilled water and drying in a ventilation oven at 60° C. The yield is 15 g dry biomass per litre. The quality of the resulting biomass in each batch is monitored for myconoside content and phenolic compounds.

The culture fluid is collected and dried in a vacuum evaporator at 60° C. The yield is 30 g/l dry weight.

Figure 1B:
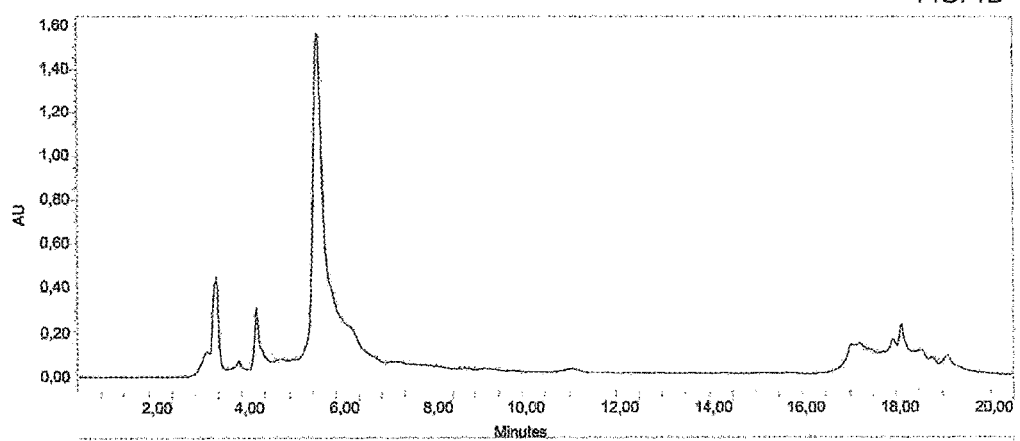
FIG. 1B is an HPLC profile illustrating the myconoside content in biomass obtained from wild *Haberlea rhodopensis* plants.
Figure 1C:
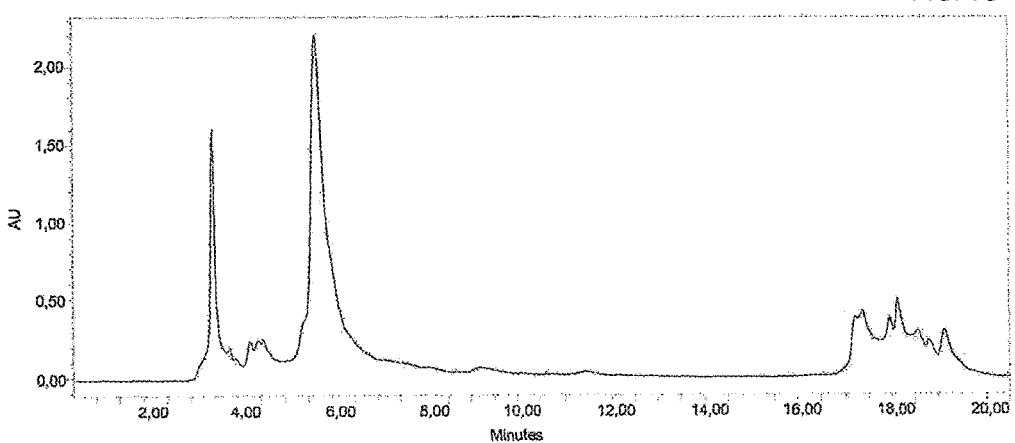
FIG. 1C is an HPLC profile illustrating the myconoside content in extract obtained from in vitro seedling culture biomass of *Haberlea rhodopensis* Friv.

Comparative HPLC profiles for myconoside content of biomass from HR in vitro cultures (A), wild plant biomass (B), and extract from biomass from HR in vitro seedling cultures (C) are presented in FIGS. 1A, 1B, and 1C.

3) Preparation of Myconoside-Standardized Extract from Biomass of In Vitro HR Seedling Cultures:

The resulting dry biomass and culture liquid are mixed and homogenized in a homogenizer. For this purpose, 2 kg of dry biomass and 2.5 kg of dry culture liquid (obtained from 200l in vitro seedling culture grown under submerged conditions) are used.

A water-ethanol mixture of 70% ethanol is added at hydromodule 20 (weight to volume) for 35 hours, at 40° C. with sonication for 15 min every 4 hours, the resulting precipitate is removed by vacuum filtration and the filtrate is collected and dried by vacuum evaporation at 40° C. to obtain a viscous concentrate containing 12% moisture.

One kg of biomass extract from in vitro seedling cultures of HR, containing 208 g/kg myconoside is obtained.

The extract is characterized phytochemically, the results are presented in Table 1. The amount of myconoside and the contents of phenolic compounds, fatty acids, organic acids, amino acids, sugars and sterols are monitored by HPLC and GC/MS methods.

HPLC content of myconoside in the extract from HR in vitro biomass obtained according to Example 1 and compared with standard 70% ethanol extract from HR plants growing in their natural habitat, as well as standard 70% ethanol extract from in vitro seedling culture of HR are presented in Table 2.

3.1. Dissolution of the HR In Vitro Culture Extract Regarding the Myconoside Content To 240.4 g of the extract, containing 208 g/kg myconoside, 759.6 g of glycerol is added to produce 1 kg of extract, containing 5% myconoside. The resulting mixture is stirred until complete homogenization of the extract using a vibrating stirrer. The resulting solution is packaged in sterile packs and stored for use in cosmetic products, pharmaceuticals or food supplements. For cosmetic purposes, the standardized extract from HR in vitro cultures is suitable in amounts of from 0.1 to 15% for products like creams, emulsions, gels, etc. Table 3 also presents a comparative analysis of the antioxidant properties of the extract from HR in vitro cultures, obtained according to Example 1, compared to the standard 70% ethanol extract from HR plants growing wild. The ability of the extract to capture free DPPH and ABTS radicals, as well as the ability to reduce copper (II) and iron (III) ions, was evaluated.

TABLE 1

Phytochemical composition of extract from biomass of HR in vitro cultures, obtained according to Example 1/GC/MS, and HPLC methods. Results are expressed in % by weight.

| | |
|---|---|
| Fatty acids | 1.10 |
| Sterols | 0.93 |
| Organic acids | 5.86 |
| Amino acids | 9.91 |
| Free phenolic acids | 0.47 |
| Sugars | 53.50 |
| Polyphenols | 28.23 |

Agilent Technology Hewlett Packard 7890 A+/MSD 5975 apparatus (Hewlett Packard, Palo Alto, CA, US) coupled with an Agilent Technology 5975C inert XL EV/CI MSD Mass Spectrometer (Hewlett Packard, Palo Alto, CA, US). HP-5 MS column (30 m×250 µm×0.25 µm) at 60° C. temperature program for 2 min, with a temperature rise to 260° C. with 5° C. per minute, and exposure at 260° C. for 8 min. The volume of the injected sample is 1 µl at a split ratio of 10:1. Injector temperature 250° C. with a flow carrying gas (helium) of 1 mL/min. The EI/MS spectrum is recorded at 70 eV.

HPLC system, Waters 1525 Binary pump (Waters, Milford, MA, USA), Waters 2487 Dual A Absorbance Detector (Waters, Milford, MA, USA) operated by Breeze 3.30 software; Supelco Discovery HS C18 column (5 µm, 25 cm×4.6 mm), t 28° C.; mobile phase with a gradient of 2% acetic acid and acetonitrile;

TABLE 2

Phytochemical HPLC comparative analysis of phenylethanoid glycoside-myconoside

| | HR extract acc. To Example 1 mg/100 g extract | Standard 70% ethanol extract from HR/ mg/100 g fresh weight plant from nature | Standard 70% ethanol extract from in vitro biomass from HR acc. To Example 1; mg/100 g fresh biomass |
|---|---|---|---|
| Myconoside | 120863.80 | 1249.61 | 12053.93 |

Example 2

The method is the same as in Example 1, except that leaves of HR are processed instead of seeds, and root cultures are prepared and used as in vitro culture. Cultivation is carried out in a bubble column, biosynthesis is enhanced by feeding instead of elicitation, and the resulting extract contains only accumulated biomass without culture liquid.

1) Initiation of In Vitro Cultures from HR:

1.1. Washing

Three to ten 2-5 cm young HR leaves are washed for 3 min in sterile distilled water with added detergent (Tween 80), treated with 80% ethanol for 60 sec and with 6% calcium hypochlorite for 30 min, triple-washed with sterile distilled water for 3 min and dried on sterile filter paper for 2 min.

1.2. Initiation

The sterile leaves are processed by excising dead areas. The leaves are then cut into 0.5 to 1.0 cm segments and initiated on semi-solid, pre-sterilized at 121° C. for 30 min standard BS nutrient medium supplemented with 4% sucrose and 8 mg/l picloram, gellrite 3%, and additional supplementation of 5 mg/l ascorbic acid and 5 mg/l 2-Mercaptoethanol, pH 5.5, cultured at 24° C.+2° C. in darkness for 4 weeks, with monitoring for asepsis until root cultures are formed from the leaves in 90% of the explants.

1.3. Independent Growth

The resultant in vitro cultures of adventitious roots are cultured individually on the same medium as in Example 2, step 1.2, with the addition of 3 g/l activated charcoal, in a thermostat at 24° C. in darkness for 37 days to obtain morphologically stable myconoside overproducing lines, where 15% of high-yielding lines are selected from the total number of in vitro lines generated.

2) Biomass Production 2.1. Maintenance, Adaptation-Subcultivation of Selected In Vitro Root Cultures The selected root culture lines are maintained by periodic subcultivation every 37 days on the semi-solid fresh medium in step 1.3 of Example 2, changes in morphology and stability are monitored, and the amount of myconoside is determined. 15 g of biomass from the high-yielding lines are cultivated in sterile liquid BS medium with the same additions as in step 1.3 of Example 2 in a 500 ml flask on an orbital shaker at 100 rpm, and 85% of the most adaptive lines continue for the subsequent submerged cultivation as inoculum.

2.2. Cultivation of Adapted In Vitro Root Line Cultures for Biomass Production 30 g fresh weight/l of 30-day-old root culture at the exponential phase of growth are cultured on liquid BS medium with the same additions as in step 1.3, at 24° C.±2 in darkness for 4 weeks in a bubble column at air flow rate of 0.3 l/l/min. 130 g/l of fresh biomass yield dry biomass with a myconoside content of 120 mg/g.

2.3. Stimulation of Biomass Production

The biomass, which is at the late exponential phase of growth (35 days old), is aseptically supplemented with fresh liquid BS medium up to the maximum working volume of the bioreactor and cultivated under the conditions described above for a period of 10 to 15 days. The result at the end of the process is enriched biomass containing myconoside of 170 mg/g dry biomass. The resulting biomass is separated from the culture fluid by filtration, washed and dried. The yield is 12 g of dry biomass per litre.

3) Preparation of Myconoside-Standardized Extract from In Vitro Biomass of HR Root Culture:

3 kg of dried biomass from the in vitro cultivated root culture is ground and subjected to extraction by maceration with 80% aqueous ethanol mixture at hydromodule 40 (weight to volume) for the same period of time and at the same temperature as in Example 1, except that it is conducted without sonication to obtain viscous concentrate containing 15% moisture. 500 g of biomass extract from in vitro HR root culture containing 280 mg/g myconoside are obtained.

3.1. Dissolution of the Resulting In Vitro Root Culture Extract of HR Regarding Myconoside Content 357.1 g of the myconoside-rich in vitro root culture of HR are weighed in a vessel. 642.9 g of glycerol are added to the desired weight of 1 kg of extract containing 10% myconoside. The resulting mixture is stirred until complete homogenization of the extract with sonication, packaged in sterile packs and stored for future use.

Example 3

Conducted like Example 1, except that instead of seeds, ovaries are processed, and instead of seedling cultures, callus and cell suspension cultures are obtained and used as in vitro cultures. Cultivation is carried out in Erlenmeyer flasks.

1) Initiation of In Vitro Callus Cultures from HR
1.1. Washing

Two to five 5 newly-formed 0.2-0.5 cm HR ovaries are washed for 1-2 minutes in sterile distilled water, treated with 70% ethanol for 90 seconds, and 10% sodium hypochlorite for 40 minutes, followed by washing with sterile distilled water for 1 min and dried on sterile filter paper for 1 min.

1.2. Initiation

The resulting sterile ovaries are cut horizontally in half and transferred for initiation on semi-solid, pre-sterilized at 121° C. for 30 min standard WP nutrient medium supplemented with 2% sucrose, 1 mg/l 1-naphtalene acetic acid, 1 mg/l 6-benzylaminopurine and agar-agar 4%, pH 5, and cultured at 26° C.±2° C. in darkness for 3 weeks, with monitoring for asepsis until callus formation in 93% of explants.

1.3. Independent Growth

The resulting in vitro callus cultures are ready for independent growth in a thermostat on the same medium as in step 1.2 with added citric acid of 3 mg/l and 1 g/l activated charcoal at the same temperature, in darkness for 27 days to obtain morphologically stable myconoside overproducing lines, where 11% of high-yielding lines are selected from the total number of generated in vitro lines.

2) Biomass Production
2.1. Maintenance, Adaptation of Selected In Vitro Cultures and Formation of Cell Suspension Cultures The selected callus culture lines are maintained by periodic subcultivation every 27 days on fresh semi-solid WP nutrient medium as in the previous step, changes in morphology and stability are monitored, and the amount of myconoside is analyzed. The same amount as in Example 2 step.2.2 of biomass from high-yielding lines is cultured in sterile liquid WP medium with the same additions as in the previous step in a 1000 ml flask on an orbital shaker at 80 rpm to obtain a cell suspension culture consisting of small and medium-sized aggregates, the 75% most adaptable of the lines continue for the next submerged cultivation as inoculum.

2.2. Cultivation of Adapted Cell Suspension Cultures for Biomass Production 100 g of fresh weight/t 7-day-old cell suspension culture at the exponential phase of growth are cultured at 26° C. in darkness for 9 days in 2000 ml flasks on an orbital shaker at 80 rpm. 110 g/l fresh biomass with myconoside content in the resulting biomass of 80 mg/g dry biomass is obtained.

2.3. Stimulation of Biomass Production

The biomass at the late exponential growth phase (6 days old) is aseptically supplemented with 1 g of sterilized absorption resin (Amberlite XAD7) as a second phase. Cultivation continues for a further 4 days to obtain enriched biomass with myconoside content of 100 mg/g dry biomass. It is further treated as in Example 1, and the biomass and culture fluid are freeze dried at −40° C. The yield is 9 g dry biomass per litre and 15 g dry weight culture fluid per litre.

3) Preparation of Myconoside-Standardized Extract from In Vitro Biomass of HR Suspension Culture The total of 1 kg of dried biomass and culture fluid are homogenized and extracted by maceration with a 30% ethanol water-ethanol mixture at hydromodule 10 (weight to volume) at the same temperature and for the same duration, with precipitation, separation and drying as in Example 1 to obtain a viscous concentrate containing 20% moisture. 100 g of extract from biomass of *Haberlea rhodopensis* in vitro cell suspension culture containing 150 mg/g myconoside are obtained.

3.1. Dissolution of the Resulting In Vitro HR Suspension Culture Extract Regarding Myconoside Content 100.0 g of the myconoside-rich HR extract obtained from in vitro cell suspension culture are weighed. 400.0 g of glycerol are added thereto to the desired weight of 500 g of extract containing 3% myconoside. The mixture is stirred until the extract is completely homogenized using a rotary or high-pressure homogenizer, and the resulting solution is packed in sterile containers and stored for future use.

TABLE 3

Comparative analysis of antioxidant properties of extract from in vitro HR cultures prepared according to Example 1 compared to the standard 70% ethanol extract of HR from nature:

|  | Total phenols mgGAE/g | DPPH $EC_{50}$ mg/ml | TEAC,mM Trolex Equivalent/g | FRAP,mM Trolex Equivalent/g | CUPRAC, mM Trolex Equivalent/g |
|---|---|---|---|---|---|
| Extract from PCC of HR | 30.87 ± 0.57 | 0.041 | 493.08 ± 0.97 | 622.87 ± 3.68 | 1199.91 ± 14.39 |
| Standard 70% ethanol extract of HR | 29.44 ± 0.09 | 0.042 | 402.69 ± 3.95 | 564.07 ± 5.15 | 1037.90 ± 24.44 |

DPPH (2,2-diphenyl-l-picrylhydrazyl)/HR extract/0.1 mM solution of DPPH radical/in darkness, at 21° C. for 15 minutes/% decrease in absorption at A=517 nm compared to the control sample (with methanol addition)/determination of $EC_{50}$ (effective concentration inhibiting 50% of DPPHradial in 0.1 mM DPPH solution).

TEAC/ABTS (2,2'-azino-bis(3-ethylbenzthiazoline-6-sulfonic acid) radical/HR extract is added to a solution of pre-generated ABTS radical/darkness at 21° C. for 15 minutes/% decrease in absorption at A=734 nm compared to that of a control (with methanol addition)/result as mM Trolox ((±)-6-hydroxy-2,5,7,8-tetramethylchroman-2-carboxylic acid).

The following are used to evaluate the reducing capacity:

CUPRAC/HR extract/solution of Cu (II) ions in the presence of chelating agent neocuproine/darkness at 21° C. for 15 minutes/reduction of Cu (II) to Cu (I)/absorption maximum at $\lambda$=450 nm/mM Trolox result;

FRAP-HR extract/Fe (III) ion solution in the presence of TPTZ (2,4,6-tris(2-pyridyl)-s-triazine)/darkness, at 21° C. for 15 mini reduction of Fe (III) to Fe (II)/Fe-TPTZ complex/absorption maximum at A=593 nm/mM Trolox result

REFERENCES (1) Journal of Ethnopharmacology "The ancient Thracian endemic plant *Haberlea rhodopensis* Friv. And related species: A review", 2019, Yordan N. Georgiev;
(2) Plant Cell, Tissue and Organ Culture (2005) 80:115-118 Djilianov,
(3) International Journal of Cosmetic Science, 2012, 34, 132-139 "Skin benefits of a myconoside-rich extract from resurrection plant *Haberlea rhodopensis*", Dell Acqua and Schweiker;
(4) Natural Product Research: Formerly; Natural Product Letters "*Haberlea rhodopensis*: pharmaceutical and medical potential as a food additive", 2015; Rumiana Todorova;
(5) JP2011 168560A;
(6) JP2015503212;
(7) EP 1736167;
(8) RU 2 559579;
(9) WO2019175829.

The invention claimed is:

1. A plant extract from in vitro culture biomass containing bioactive compounds and their primary and secondary metabolites, wherein the plant extract is obtained from undifferentiated in vitro cultures of *Haberlea rhodopensis* Friv. (HR).

2. The plant extract according to claim 1, wherein the bioactive compounds and their primary and secondary metabolites comprise organic acids, fatty acids, amino acids, sterols, free phenolic acids, and sugars.

3. The plant extract according to claim 1, wherein the extract contains in weight % as follows: organic acids from 4.0 to 6.0, fatty acids from 0.5 to 1.5, amino acids from 8.0 to 12.0, sterols from 0.5 to 1.0, free phenols from 3.0 to 6.0, sugars from 45 to 55, and polyphenols from 25.0 to 35.0.

4. The plant extract according to claim 1, wherein the plant extract contains myconoside.

5. The plant extract according to claim 4, wherein the myconoside ranges from 18% to 35% of the total extract.

6. The plant extract according to claim 1, wherein the plant extract is standardized relative to myconoside.

7. A composition containing the plant extract according to claim 1, wherein the plant extract further contains glycerol.

8. A method for the preparation of a plant extract obtained from in vitro cultures of *Haberlea rhodopensis* Friv. (HR), the method comprising the steps of:
providing HR explants;
treating the explants and culturing the treated material with or without growth regulators, to obtain cell cultures;
growing the cultures with or without reducing agents and/or antioxidants;
selecting myconoside-overproducing and morphologically stable undifferentiated in vitro culture lines;
propagating the stable in vitro culture lines in aqueous growth medium with growth regulators to produce propagated biomass;
separating the biomass from the medium to obtain a mixture; and
treating the obtained mixture to produce plant extract.

9. The method for the preparation of a plant extract according to claim 8, where the HR explants are treated by repeated washing with sterile distilled water, treated with 40-85% ethanol, subsequently treated with 2-10% disinfectant with or without added detergent, washed repeatedly with sterile distilled water and dried, culturing the resultant sterile explants on semi-solid or liquid sterile nutrient media with or without added growth regulators, at 18-32° C. in darkness or light/dark photoperiod for 8-16 hours, pH 5-6.2, to obtain undifferentiated cultures, followed by independent growth of the in vitro cultures on semi-solid sterile nutrient media with or without added growth regulators, and with or without added reducing agents and/or antioxidants, at 18-32° C. under the same photoperiod as the darkness or light/dark photoperiod for 8-16 hours, to obtain 5-30% selected myconoside-overproducing and morphologically stable in vitro culture lines, maintained on fresh semi-solid medium with or without added growth regulators, whereresulting high-yielding in vitro cultures are cultured for further adaptation in a sterile liquid nutrient medium with added: carbon source, growth regulators and/or antioxidants to obtain cell lines adapted to submerged cultivation, which is re-inoculated into the liquid medium for further cultivation under the same photoperiod as the darkness or light/dark photoperiod for 8-16 hours, followed by the addition of factors to enhance the biosynthesis of plant secondary metabolites selected from elicitors, supplementation with fresh nutrient medium, addition of precursors, inclusion of a second phase in the cultivation system or a combination thereof, to obtain myconoside-enriched biomass, followed by separation of the resulting biomass from the culture liquid and drying or freeze drying, the resulting dry mixture is homogenized with 30-80% ethanol at 18-45° C., filtration of the resulting dry mixture, separation of the precipitate, collection and concentration under vacuum of the resulting filtrate to obtain a concentrate with 10-30% moisture, and finally the resulting concentrate is dissolved to obtain the plant extract.

10. The method for the preparation of a plant extract according to claim 8, wherein the HR explants are selected from leaves, stems, hypocotyls, roots, seeds, anthers, fruit-sovaries, sepals, seedlings, and wherein the cell cultures comprise of seedlings, meristem cultures, root cultures, somatic embryos, callus cultures, cell suspension cultures.

11. A plant extract obtained by the method of claim 8.

12. Biomass produced by the method of claim 8.

13. The biomass according to claim 12, wherein the biomass contains myconoside of not less than 80 mg/g of dry biomass.

14. A food, cosmetics or pharmaceutical industries product containing the plant extract according to claim 1.

15. A food, cosmetics or pharmaceutical industries product containing the biomass according to claim 12.

16. A plant extract obtained by the method of claim 9.

17. Biomass produced by the method of claim 9.

18. The biomass according to claim 17, wherein the biomass contains myconoside of not less than 80 mg/g of dry biomass.

19. A food, cosmetics or pharmaceutical industries product containing the plant extract according to claim 17.

20. A food, cosmetics or pharmaceutical industries product containing the plant extract according to claim 11.

21. A food, cosmetics or pharmaceutical industries product containing the plant extract according to claim 16.

\* \* \* \* \*